United States Patent
Schwarz

(10) Patent No.: US 10,827,681 B2
(45) Date of Patent: Nov. 10, 2020

(54) COMBINE HARVESTER INCLUDING A CLEANING DEVICE TO SEGREGATE HARVESTED MATERIAL

(71) Applicant: CLAAS Selbstfahrende Erntemaschinen GmbH, Harsewinkel (DE)

(72) Inventor: Michael Schwarz, Rheda-Wiedenbrück (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 171 days.

(21) Appl. No.: 16/037,586

(22) Filed: Jul. 17, 2018

(65) Prior Publication Data
US 2019/0069490 A1 Mar. 7, 2019

(30) Foreign Application Priority Data
Sep. 7, 2017 (DE) .......................... 10 2017 120 675

(51) Int. Cl.
*A01F 12/44* (2006.01)
*A01F 12/46* (2006.01)

(52) U.S. Cl.
CPC .......... *A01F 12/442* (2013.01); *A01F 12/444* (2013.01); *A01F 12/446* (2013.01); *A01F 12/46* (2013.01)

(58) Field of Classification Search
CPC ...... A01F 12/442; A01F 12/46; A01F 12/446; A01F 12/444; A01F 7/062; A01F 7/06;
(Continued)

(56) References Cited

U.S. PATENT DOCUMENTS 126,117 A * 4/1872 Wemple .................. A01F 11/00
460/64
541,769 A * 6/1895 Macomber .............. B07B 4/025
209/148
(Continued)

FOREIGN PATENT DOCUMENTS

DE 1023917 B 2/1958
DE 2835899 A1 1/1979
(Continued)

OTHER PUBLICATIONS

European Search Report in corresponding European Application No. 18179206.0, dated Jan. 11, 2019, 8 pages.

*Primary Examiner* — Arpad Fabian-Kovacs
(74) *Attorney, Agent, or Firm* — Lempia Summerfield Katz LLC

(57) ABSTRACT

A combine harvester is disclosed with an infeed arrangement for receiving the harvested material, with a threshing device for degraining the harvested material, and with a cleaning device that is downstream from the threshing device for segregating the harvested material, and thereby separating the grain from the non-grain components. The cleaning device has a sieve device that can rotate about a rotational axis with an at least sectionally sieve-shaped sieve jacket that extends in a peripheral direction around the rotational axis. Separating the grain from the non-grain components is performed by the cleaning device by superimposing a rotary movement and oscillating movement of the sieve jacket such that the oscillating movement is directed transverse to the rotational axis of the sieve device, wherein the oscillating movement is caused by a segmentation of the sieve jacket in a peripheral direction, and a swinging of each peripheral segment of the sieve jacket about a pivot axis associated with the respective peripheral segment.

21 Claims, 5 Drawing Sheets

(58) Field of Classification Search
CPC .................... A01F 12/18; B07B 4/025; B07B 1/24; B07B 9/00
See application file for complete search history.

(56) References Cited

U.S. PATENT DOCUMENTS

| | | | | |
|---|---|---|---|---|
| 771,368 | A * | 10/1904 | Jakob | B07B 1/24 209/297 |
| 2,880,734 | A * | 4/1959 | Edstrom | B07B 4/025 460/65 |
| 2,905,182 | A * | 9/1959 | Wise | A01F 7/00 460/64 |
| 3,306,302 | A * | 2/1967 | Hing | A01F 12/18 460/59 |
| 3,410,270 | A * | 11/1968 | Herbsthofer | A01F 12/181 460/67 |
| 3,443,565 | A * | 5/1969 | Jouveneaux | A01F 12/52 460/64 |
| 3,756,406 | A * | 9/1973 | Khan | B07B 1/24 209/291 |
| 3,808,780 | A * | 5/1974 | Wood | A01F 12/442 56/14.6 |
| 4,143,665 | A * | 3/1979 | Griffin | A23N 15/10 209/45 |
| 4,154,250 | A * | 5/1979 | Stuber | A01F 7/065 460/104 |
| 4,198,802 | A | 4/1980 | Hengen et al. | |
| 4,274,426 | A * | 6/1981 | Williams | A01F 7/062 460/67 |
| 4,284,086 | A * | 8/1981 | Williams | A01F 12/18 460/150 |
| 4,330,000 | A * | 5/1982 | Peiler | A01F 12/28 460/109 |
| 4,353,376 | A * | 10/1982 | Schuler | A01F 12/44 460/67 |
| 4,465,080 | A | 8/1984 | De Coene | |
| 4,700,718 | A * | 10/1987 | Rissanen | A01F 7/062 460/61 |
| 4,904,224 | A * | 2/1990 | Pohjala | A01F 12/00 460/59 |
| 4,957,467 | A * | 9/1990 | Zachary | A01F 12/442 460/69 |
| 5,803,807 | A * | 9/1998 | Satzler | A01F 7/062 460/119 |
| 6,468,152 | B2 * | 10/2002 | Moriarty | A01F 7/06 460/67 |
| 10,314,236 | B2 * | 6/2019 | Puvak | A01F 12/442 |
| 2001/0039202 | A1 * | 11/2001 | Brantley | A01D 45/22 460/132 |
| 2012/0270612 | A1 * | 10/2012 | Baltz | A01F 12/24 460/109 |
| 2015/0065212 | A1 * | 3/2015 | Kvist | A01F 7/062 460/61 |
| 2017/0339832 | A1 * | 11/2017 | Matousek | A01F 12/26 |
| 2019/0069487 | A1 * | 3/2019 | Schwarz | A01F 7/062 |

FOREIGN PATENT DOCUMENTS

| | | |
|---|---|---|
| DE | 3324492 A1 | 1/1985 |
| EP | 0102116 A | 3/1984 |

* cited by examiner

COMBINE HARVESTER INCLUDING A CLEANING DEVICE TO SEGREGATE HARVESTED MATERIAL

CROSS REFERENCE TO RELATED APPLICATION

This application claims priority under 35 U.S.C. § 119 to German Patent Application No. DE 102017120675.2, filed Sep. 7, 2017, the entire disclosure of which is hereby incorporated herein by reference.

TECHNICAL FIELD

The technical field relates to an agricultural machine. More specifically, the technical field relates to a combine harvester.

BACKGROUND

Combine harvesters (also referred to as combines) typically have one or more devices following the threshing device which perform the degraining of the harvested material in order to segregate the harvested material components separated during threshing. A separating device accordingly may follow the threshing device, with the separating device removing the portion of freely movable grain from the threshed stream of harvested material and supplying the remaining straw to the combine chopping device. Such a separating device can, for example, be a straw walker or a separating system with one or two rotors installed in the longitudinal direction. In addition to the separating device, the combine typically includes a cleaning device that is supplied the grain segregated in the threshing device and/or the separating device. Accordingly, the grains entrain many non-grain components (e.g., chaff and straw particles) that are separated from the grain in the cleaning device.

Thus, a plurality of different cleaning devices are used to segregate the harvested material and thereby separate the grain from non-grain components. These are normally based on a combined sifting and winnowing, i.e., a flow of air blows toward the material for cleaning consisting of grains and non-grain components. The cleaned grain is then fed to a combine grain tank, such as, for example, by using a grain elevator.

DE 28 35 899 C2 discloses a combine with a cleaning device, with the cleaning device being based on the principle of rotating cleaning. Specifically, the harvested material to be segregated is fed to a rotating sieve device, also termed a sieve rotor, that has a sieve-shaped sieve jacket, e.g., provided with sieve holes. The sieve jacket has a frusto-conical or conical shape, wherein the end with the smaller cross-section faces the threshing part of the combined threshing and separating device such that the sieve device expands in the direction of the harvested material flow. While the harvested material to be segregated is guided through the conical sieve device, the sieve device rotates about a rotational axis that runs in the driving direction of the combine, and hence orthogonal to the direction of gravity. At the same time, the cleaning device performs an oscillating movement parallel to the rotational axis.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
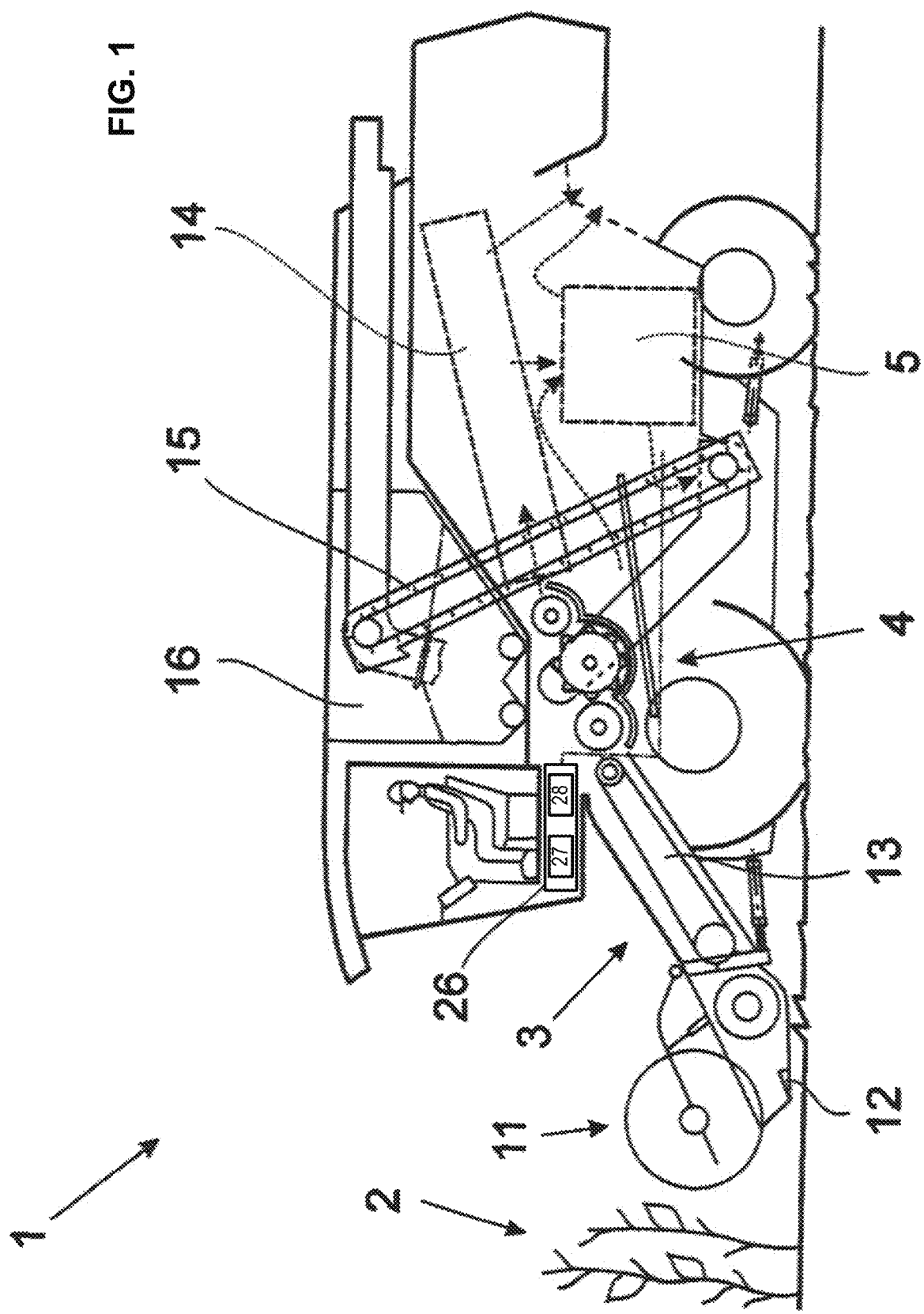
FIG. 1 illustrates a schematic side view of one implementation of the combine harvester.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

As discussed in the background, DE 28 35 899 C2 discloses a combine with a rotating sieve device. In this regard, the harvested material to be segregated in DE 28 35 899 C2 is fed not to a substantially flat sieve but rather to the rotating sieve device that has the sieve-shaped sieve jacket. Further, the principle of rotating cleaning, such as illustrated in DE 28 35 899 C2, may yield an improved cleaning effect in comparison to the principle of flat cleaning since the effect of centrifugal forces is used to segregate grain and non-grain components in addition to the effect of gravity. Nonetheless, the cleaning effects when using rotating cleaning may be limited, thereby limiting the performance of the combine harvester.

In one implementation, a combine is disclosed which improves the cleaning effect on the threshed harvested material. In a specific implementation, a combine is disclosed with an infeed arrangement, a threshing device, and a cleaning device. The infeed arrangement receives the harvested material (which may consist of a crop). In one implementation, the infeed arrangement receives the harvested material, with the harvested material thereafter being supplied to a downstream portion of the combine, such as via an inclined conveyor. The threshing device threshes the harvested material, thereby degraining the harvested material. In particular, the threshing device may generate a first portion of harvested material (which may comprise more grain than straw, such as composed primarily of grain) and a second portion of harvested material (which may comprise more straw than grain, such as composed primarily of straw).

Optionally, the second portion of harvested material (which may be composed primarily of straw) may then be supplied to a downstream separating device. In one implementation, the separating device may comprise a shaker, such as a straw walker, or at least one separating rotor (such as an axial rotor) for removing freely movable grains from the second portion of harvested material. In this way, a third portion of harvested material may be generated that also primarily contains grain (e.g., more grain than straw).

One or more portions of the harvested material that contain primarily grain (e.g., more grain than straw), such as the first portion of harvested material and the third portion of harvested material, may be supplied to the downstream cleaning device. In a first implementation, only the first portion of harvested material is supplied to the downstream cleaning device. In a second implementation, only the third portion of harvested material is supplied to the downstream cleaning device. In a third implementation, both the first portion of harvested material and the third portion of harvested material are supplied to the downstream cleaning device.

The cleaning device is configured to segregate the harvested material, and thereby separate the grain from the non-grain components. The cleaning device includes a separating device, such as a sieve device, that can rotate about a rotational axis with a screening jacket that extends at least partly around a circumference or a periphery around the rotational axis (e.g., an at least sectionally sieve-shaped sieve jacket that extends partly or entirely in a peripheral or circumferential direction around the rotational axis). Further, segregation by the cleaning device is accomplished by generating a rotary movement and an oscillating movement of the screening jacket (such as the sieve jacket so that the oscillating movement is directed transverse to the rotational axis of the sieve device). The oscillating movement may be at least simultaneous with the rotary movement and may be at least partly transverse to the rotational axis (such as entirely orthogonal, substantially orthogonal, to the rotational axis). Thus, the sieve device is one example of a screening device and a sieve jacket is one example of a screening jacket. Any discussion below regarding a sieve device and/or a sieve jacket may be equally applied to the screening device and screening jacket.

For example, the cleaning device may superimpose the rotary movement and oscillating movement of the sieve jacket so that the rotary movement and the oscillating movement are performed at least partly simultaneously. In a first specific implementation, separate components within the cleaning device may generate the rotary movement and oscillating movement, with the net effect of the rotary movement and oscillating movement being superimposed on one another. In a second specific implementation, a single component within the cleaning device may generate the rotary movement and oscillating movement.

In this way, the combine performs segregation by superimposing a rotary movement and oscillating movement (such as a linear oscillating movement) of the sieve jacket such that the oscillating movement is directed or introduced transverse to the rotational axis of the sieve device. In one implementation, the oscillating movement is directed transverse to the rotational axis of the sieve device, wherein the oscillating movement is caused by a segmentation of the sieve jacket in a peripheral direction, and a swinging of one, some, or each of peripheral segments of the sieve jacket about a pivot axis associated with the respective peripheral segment. In this regard, the swinging movement comprises an example of the oscillating movement.

Thus, the oscillating movement may comprise a back-and-forth movement of at least a part of the sieve jacket. In a first specific implementation, an entirety of the sieve jacket undergoes the oscillating movement. In a second specific implementation, less than an entirety of the sieve jacket undergoes the oscillating movement. Specifically, less than the entirety of the sieve jacket moves back and forth in one and the same direction. In particular, a plurality of sections of the sieve jacket may move back and forth at least partly transverse (such as entirely transverse) to the rotational axis. In the latter oscillating movement, the sections of the sieve jacket, in at least one section of their movement, move in an oscillating manner. For example, the sections of the sieve jacket may move at least partly toward the rotational axis (such as entirely toward the rotational axis) and at least partly away from or at least partly contrary to the rotational axis (such as directly away from or entirely contrary to the rotational axis), wherein the sections of the sieve jacket move back-and-forth, in particular mainly within the outer radial limit of the sieve jacket. In addition to the oscillating movement of the sieve jacket, the sieve jacket rotates about the rotational axis. In this regard, at least a part (and potentially all) of the sieve jacket undergo the oscillating movement (e.g., swinging) and the rotational movement at least partly simultaneously.

In addition to gravity, both centrifugal force as well as acceleration directed toward the rotational axis may act on the harvested material to be segregated, such as toward an interior of the sieve jacket and hence contrary or opposite to the acceleration force directed opposite the centrifugal force. In one implementation, the sieve device rotates continuously. In this implementation, the centrifugal force acts continuously responsive to the sieve device rotating continuously. Alternatively, the sieve device does not rotate continuously. In one implementation, the centrifugal force (responsive to the rotational movement) is applied at different times than the oscillating force (responsive to the oscillating movement). For example, the centrifugal force may be constant (e.g., for at least a predetermined time period), whereas the oscillating force is not constant (e.g., within the predetermined time period where the centrifugal force is constant and the sieve device is rotating continuously, the oscillating force is not constant and varies, such that at different times within the predetermined time period, the oscillating force is a first oscillating force (e.g., zero force) and at other times within the predetermined time period, the oscillating force is a second oscillating force that is different from the first oscillating force (e.g., non-zero)). In particular, using the oscillating movement transverse to the rotational axis, the harvested material may be exposed to brief pulses counter to the direction of centrifugal force in sync with the oscillating movement, which may result in an improvement or an optimization of the segregation process. Accordingly, using the oscillation-induced pulses (e.g., the swinging-induced pulses), the grains may be thrown further into the interior of the sieve device than the lighter non-grain components, wherein the non-grain components are guided out of the sieve device by an air stream directed toward the harvested material to be segregated, whereas the grains, due to their comparatively heavy weight, initially continue to fall in the direction of gravity despite the air stream, and are then discharged from the sieve device radially through the sieve holes in the sieve jacket by the centrifugal force in a state separated or cleaned from the non-grain components. In this regard, the cleaning effectiveness may be significantly improved by the superimposition of such rotary movement and oscillating movement of the sieve jacket.

In one implementation, the oscillating movement is achieved by segmenting the sieve jackets in a peripheral direction, e.g., the sieve jacket has a plurality of peripheral segments distributed over part or all of its perimeter, with one, some or all of the peripheral segments swinging back-and-forth as described. Thus, in a specific implementation, the sieve jacket is at least partially subject to segmentation such as one or more parts (e.g., the peripheral segments) of the sieve jacket may be segmented in a peripheral direction. In one implementation, the swinging movement comprises a pivoting or flapping movement, e.g., the peripheral segments move back-and-forth on a pivot axis associated with the respective peripheral segment. In this case, individual peripheral segments of the sieve jacket distributed over the perimeter of the sieve jacket oscillate, wherein the individual oscillating movements transverse to the rotational axis together form the overall oscillating movement of the sieve jacket.

In one implementation, the respective pivot axis and the rotational axis lie in a common plane. In an alternate implementation, the respective pivot axis and the rotational axis lie in planes that are orthogonal or oblique to each other. Further, in one implementation, the sieve device may include a floor that is orthogonal to the rotational direction (i.e., the direction of rotation).

Various shapes of the sieve jacket and/or the sieve device comprising the sieve jacket (and optionally the floor) are contemplated. For example, the sieve jacket may be substantially conical, frustoconical, pyramidal, or frustopyramidal. Specifically, the sieve jacket may taper toward its bottom end or may be at least sectionally substantially cylindrical, and/or the peripheral segments may be brought into a position in which the sieve jacket is at least sectionally substantially conical, frustoconical, pyramidal or frustopyramidal, wherein the sieve jacket tapers toward its bottom end, or is at least sectionally substantially cylindrical.

For example, the top opposing end of the sieve jacket in an axial direction is not closed. Specifically, the harvested material to be segregated may be introduced into the sieve device from above in the direction of the bottom end, e.g., in the direction of the tapering of the sieve jacket. In particular, the non-grain components are removed from the sieve device in the opposite direction, e.g., in the direction from the bottom to top end. The sieve jacket need not necessarily have a wall running at an angle; rather, the sieve jacket may also have a cylindrical wall. It is also contemplated for the sieve jacket to have a conical or frustoconical section and a cylindrical section that follows this axially.

Thus, in one implementation, in their radially outer position, the inner surface of the sieve jacket and/or the inner surface of the peripheral segments, and/or the respective pivot axis, run obliquely to the rotational axis of the sieve device, or run parallel to the rotational axis of the sieve device. Further, the peripheral segments may have a flat or curved inner surface, and/or the peripheral segments may have a substantially rectangular or trapezoidal inner surface.

In one implementation, one, some, or all of the peripheral segments may be individually exchangeable and/or adjustable. In this manner, the peripheral segments may be optimally adapted to the respective type of harvested material.

In one implementation, the peripheral segments may overlap each other in the peripheral direction at their radially outer position. Alternatively, the peripheral segments may terminate with each other in a peripheral direction at their radially outer position.

In one implementation, the peripheral segments are connected with each other and/or the oscillating movements of the peripheral segments may be executed in sync. Thus, in a specific implementation, the oscillating movements of the disclosed peripheral segments of the sieve jacket may be evenly distributed over the perimeter of the sieve jacket can be executed synchronously, e.g., all peripheral segments are in their radially outer position at the same time and/or are at their radially inner position at the same time.

In one implementation, the cleaning device may have a supply device to supply the harvested material into the interior of the sieve device, and/or a fan to generate an airflow through the sieve device. Using the supply device, the harvested material yet to be segregated may be guided out of the supply device into the sieve device, such as initially in the region of the sieve device close to the floor. In one implementation, the supply device has an axial delivery channel for supplying the harvested material into the interior of the sieve device, and a rotating, axially running screw conveyor. The fan may generate an airflow in the opposite direction, e.g., from the bottom to the top end of the sieve jacket or the sieve device, whereby the non-grain components may be removed from the sieve device.

In one implementation, the cleaning device has a rotating deflective or diverting device in the interior of the sieve device that deflect/diverts and accelerates in a radial direction the harvested material (which may be introduced via the supply device into the sieve device) to be segregated. The deflecting device may be positioned in the region of the floor (such as positioned on the floor) of the sieve device. The deflecting device may include a rotating delivery plate which has radially running bars, at least sectionally, on the top side, or a rotating scraper and an associated acceleration plate (with an edge-side bulge. Further, the delivery plate or the scraper may be arranged at an axial distance from the delivery channel, and/or be connected to rotate conjointly with the screw conveyor.

In one implementation, the disclosed system may create a preferred path of the flow or respectively the partial flows of the harvested material during the segregation process in the cleaning device. For example, the supply device, the fan, and/or deflecting device may be oriented relative to the sieve device such that the harvested material is first introduced axially in the direction of the bottom end of the sieve device, and is then deflected radially to the outside in the region of the bottom end of the sieve device, then at least part of the harvested material is conveyed away axially and/or parallel to the inner surface of the sieve jacket from the bottom end of the sieve device, wherein finally, the grain passes through the sieve jacket radially to the outside and, at the top end of the sieve device, the non-grain components are removed therefrom.

In one implementation, the system may be configured such that the result in the oscillating movement is predetermined relative to the rotational axis of the rotatable sieve device, as well as preferred orientations of the rotational axis to the direction of gravity. For example, the oscillating movement may be directed orthogonal or at an angle different from 90° to the rotational axis, and/or the rotational axis of the sieve device may run in the direction of gravity or be oblique to the direction of gravity.

In one implementation, the radial position of the rotational axis during the oscillating movement is fixed relative to the threshing device; accordingly, the rotational axis does not also perform the oscillating movement. In this regard, the radial position of the rotational axis of the sieve device may be stationary relative to the threshing device during the oscillating movement of the sieve jacket. Alternatively, the radial position of the rotational axis may change corresponding to the oscillating movement, e.g., the rotational axis may also move with the oscillating movement. In a specific implementation, the axial position of the sieve device is fixed, e.g., the oscillating movement does not cause an axial movement of the sieve device as a whole.

Referring to the figures, FIG. 1 illustrates a schematic side view of one implementation of the combine harvester, shown as combine harvester 1. Combine harvester 1 depicted in FIG. 1 is configured to process harvested material comprising (or consisting of) a crop 2. Combine harvester 1 (also referred to as combine 1) includes an infeed arrangement 3 configured to receive the harvested material and a threshing device 4 configured to degrain the received harvested material, whereby a first portion of harvested material primarily containing grain and a second portion of harvested material primarily containing straw are generated. Combine 1 further includes a cleaning device 5 configured to segregate the harvested material after it has passed through the threshing device 4, whereby the grain from the harvested material is separated from the non-grain components. In one implementation, the cleaning process is accomplished by a combined sifting and winnowing of the harvested material in a rotatable screening device, such as rotatable sieve device 7, which rotates about a rotational axis 6. The screening device includes a screening jacket that extends at least partly (such as entirely around) the periphery or circumference of the rotational axis 6. For example, the sieve device 7 has an at least sectionally sieve-shaped sieve jacket 8 that extends in a peripheral or circumferential direction around the rotational axis 6.

Figure 2:
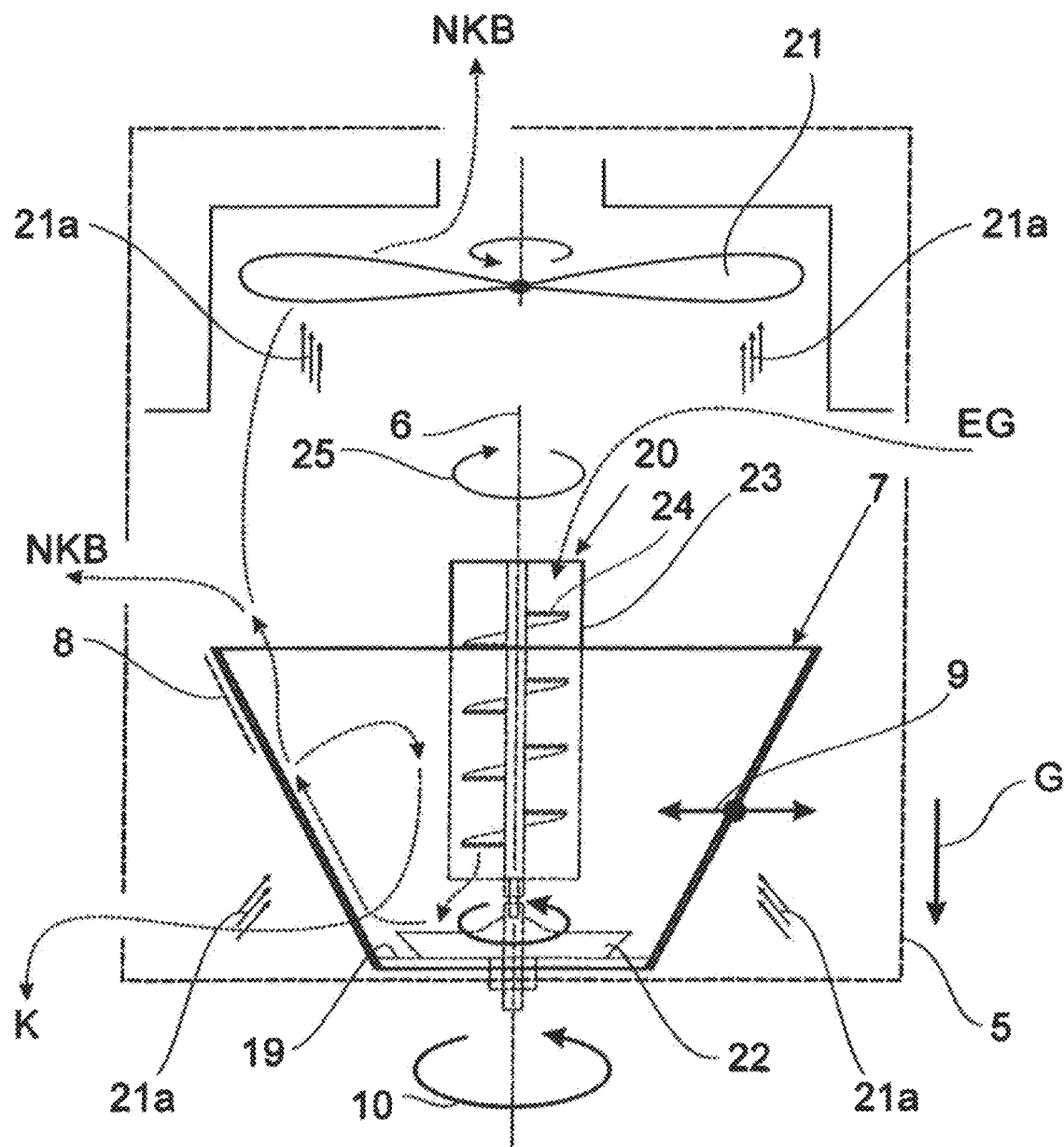
FIG. 2 illustrates a schematic representation of a combine harvester cleaning device depicted in FIG. 1.

In one implementation, combine 1 segregates and/or cleans by superimposing a rotary movement and linear oscillating movement (e.g., a swinging movement) of the sieve jacket 8, wherein the oscillating movement of the sieve jacket 8 is directed transverse to the rotational axis 6 of the sieve device 7, and wherein the oscillating movement is caused by a segmentation of the sieve jacket 8 in a peripheral direction, and a swinging of each peripheral segment 17 of the sieve jacket 8 about a pivot axis 18 associated with the respective peripheral segment 17. The oscillating movement of the sieve jacket 8 is schematically represented in FIG. 2 by a double arrow 9, and the rotary movement of the sieve jacket 8 is represented by a curved arrow 10 running clockwise. Thus, FIG. 2 depicts a clockwise rotary movement. Alternatively, a counter-clockwise rotary movement may be performed. A superimposition of the rotary movement and the oscillating movement of the sieve jacket 8 directed transverse to the rotational axis 6 may improve the cleaning effect of the cleaning device 5 since the segregation of the grain and non-grain components may be improved or optimized. Accordingly, the harvested material to be segregated in the sieve device 7 is exposed not just to gravity G and rotation-induced centrifugal force, but also to oscillation-induced force that repeatedly acts radially to the inside and hence counter to centrifugal force (e.g., at least in part, the oscillation-induced force acts counter to the centrifugal force). The combination of the different forces acting on the harvested material leads to an improved and faster separation of the grain and non-grain components, and thereby increases the grain throughput of the cleaning device 5.

The infeed arrangement 3 can be an attachment arrangement 11 that, as portrayed in FIG. 1, has a cutting system 12 comprising a reel, cutter bar and auger as well as an inclined conveyor 13, wherein the inclined conveyor 13 conveys toward the threshing device 4 the cut and collected harvested material as a harvested material stream for further processing in the combine 1. Other attachment arrangements are contemplated.

The threshing device 4 may comprise a threshing drum and threshing concave and may have a drive axis that is orthogonal in this case to the driving direction. Alternatively, the drive axis may be aligned axially or in the driving direction. The threshing device 4 is configured to separate the grain from the straw in the harvested material, wherein the corresponding harvested material portion primarily containing grain is supplied by the threshing device 4 directly to the downstream cleaning device 5, whereas the corresponding harvested material portion primarily containing straw is supplied in this case and preferably afterward to a separating device 14 that, for example via a straw walker or an axial rotor, separates freely movable grains from the harvested material portion primarily containing straw. The remaining straw may then be ejected at the rear end of the combine 1. The remaining harvested material portion primarily containing grain that is generated in the separating device 14 may then also be supplied to the cleaning device 5 and, together with the harvested material portion primarily containing grain which is directly supplied by the threshing device 4, may be guided into the rotating sieve device 7.

After the harvested material is segregated in the cleaning device 5, the non-grain components are also ejected at the rear end of the harvester 1, whereas the cleaned grain is supplied to a grain tank 16 of the combine 1 via a grain elevator 15.

Different types of oscillating movement are contemplated, such as illustrated in FIGS. 2-5. In one implementation, the radial position of the rotational axis 6 does not change relative to the combine 1 during the oscillating movement of the sieve jacket 8 (e.g., the rotational axis 6 therefore does not also oscillate). As discussed previously, the sieve jacket 8 has a plurality of peripheral segments 17 distributed over its periphery, with each one undergoing an oscillating movement transverse to the rotational axis 6 between a radially outer position and a radially inner position portrayed in FIGS. 3-5 by the double arrows 9'. The peripheral segments 17 may be exchangeable and/or adjustable depending on the harvested material, which has the additional advantage that only one peripheral segment 17 need be exchanged, and not the entire sieve jacket 8, when there is a defect in one section of the periphery or perimeter of the sieve jacket 8. The sum of the oscillating movements of the individual peripheral segments 17 (double arrows 9') may then yield the overall oscillating movement of the sieve jacket 8 (double arrow 9). Alternatively, the rotational axis 6 may additionally move back-and-forth transverse to the axial direction, e.g., so that the rotational axis may also oscillate.

The oscillating movement of the sieve jacket 8 may be exclusively transverse to the rotational axis 6, wherein the axial position of the sieve device 7 and/or the sieve jacket 8 does not change. In particular with a substantially conical, frustoconical, pyramidal or frustopyramidal sieve jacket 8, the latter does not prevent the peripheral segments 17 from also moving at least sectionally in a direction with an axial component in their oscillating movement. The frame of the sieve jacket 8 or the sieve device 7 holding the peripheral segments 17 and the axial bearing of the sieve jacket 8 or the sieve device 7 may then still be stationary, however.

As discussed above, various oscillating movements are contemplated. In a first implementation, an oscillating movement "transverse" to the rotational axis 6 may comprise an oscillating movement orthogonal to the rotational axis 6. In a second implementation, an oscillating movement "transverse" to the rotational axis 6 may comprise an oscillating movement at an angle different from 90° to the rotational axis 6. In a third implementation, an oscillating movement "transverse" to the rotational axis 6 may comprise both an oscillating movement orthogonal to the rotational axis 6 as well as an oscillating movement at an angle different from 90° to the rotational axis 6. In the case where the oscillating movement is at an angle different from 90° to the rotational axis 6 (e.g., with an oscillating movement running obliquely to the rotational axis 6), the oscillating movement may travel in a first example at an angle within a range of 50 to 80° to the rotational axis 6, in a second example at an angle within a range of 55 to 70° to the rotational axis 6, or in a third example at an angle within a range of 60 to 65° to the rotational axis 6.

As shown for example in FIG. 2, the rotational axis 6 of the sieve device 7 travels, for example, in the direction of gravity G. Alternatively, the cleaning device may be configured such that the rotational axis 6 is oblique relative to the direction of gravity G. For example, the rotational axis 6 may move in a first example at an angle within a range of 30 to 60° to the direction of gravity G, in a second example at an angle within a range of 35 to 55° to the direction of gravity G, in a third example at an angle within a range of 40 to 50° to the direction of gravity G, or in a fourth example at an angle of 45° relative to the direction of gravity G.

In one implementation, the oscillating movements of the peripheral segments 17 may move synchronously or simultaneously, wherein the synchrony or simultaneity may be achieved based on connection of the peripheral segments 17 together (e.g., hinging the peripheral segments together). For example, adjacent peripheral segments 17 may be directly connected to each other. Alternatively, movement of the peripheral segments synchronously may be achieved by a common deflection device 27 (illustrated in FIG. 4) that moves all peripheral segments 17 simultaneously.

Figure 4:
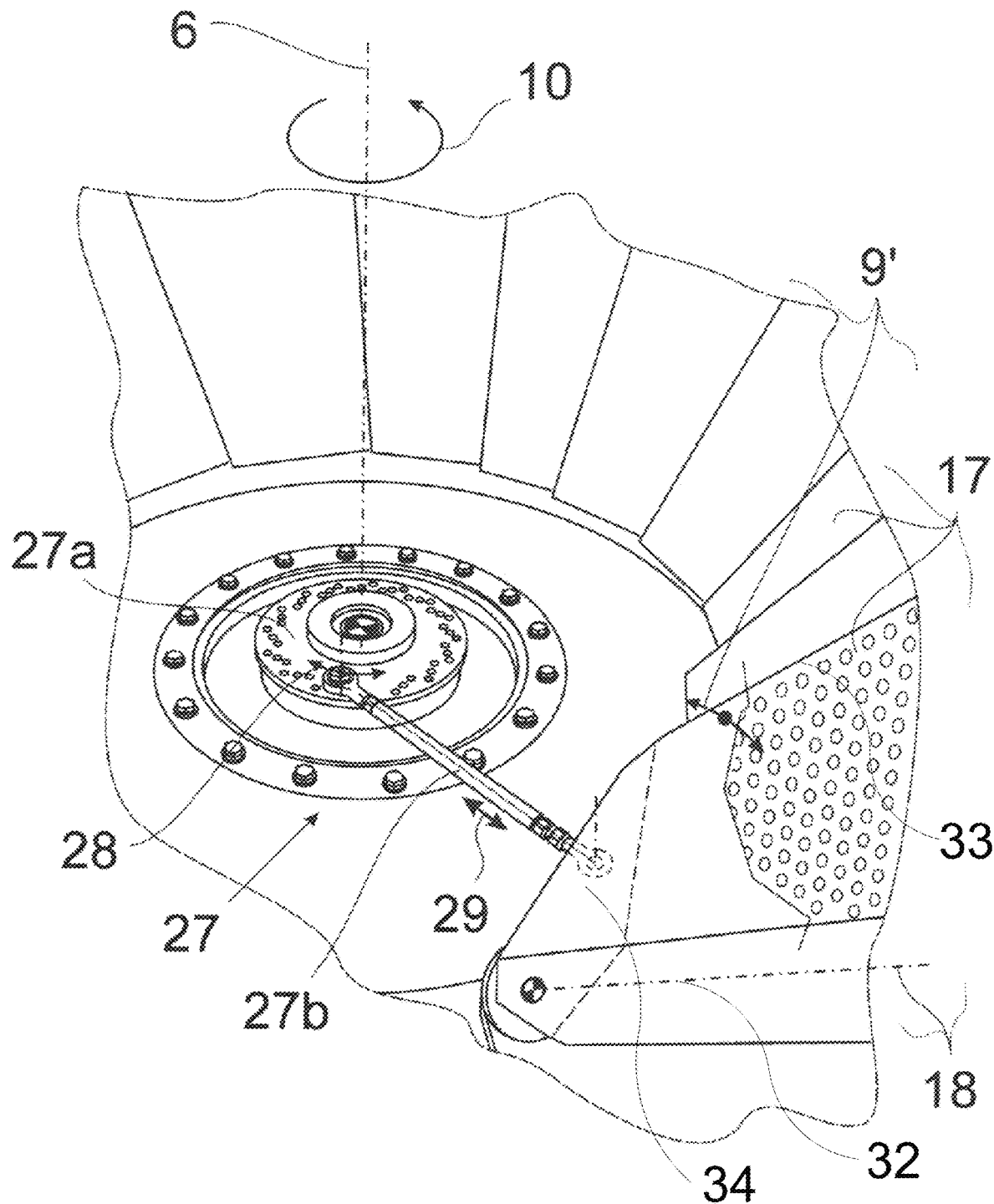
FIG. 4 shows a schematic perspective view of a deflection device for peripheral segments of the sieve device from FIG. 3.

Further, as shown in FIG. 4, peripheral segments 17 may swing about pivot axis 18. The pivot axis 18 may traverse or go through different sections of the peripheral segments. For example, as shown in FIG. 4, the pivot axis traverses or goes through a first edge section 32, which is a section at or near a first edge of a respective peripheral segment 17. Opposite the first edge section 32 is a second edge section 33, which is a section at or near a second edge (opposite the first edge) of a respective peripheral segment 17. Further, one, some or all of the peripheral segments 17 may have the respective pivot axis through the first edge section 32. Further, as shown in FIG. 4, each respective peripheral segment is attached to at least two adjacent peripheral segments at the first edge section. In operation, the second edge section 33 swings or moves more than the first edge section. Further, connecting rods 27b, discussed below, may connect to a section of the respective peripheral segment 17. It is contemplated that the connecting rods 27b may connect to various sections of the respective peripheral segment 17, such as at bottom section 34 of the respective peripheral segment 17. In one implementation, the bottom section 34 of the respective peripheral segment 17 is proximate to the floor 19 of the cleaning device.

In principle, the deflection device 27 may also cause a phase shift (or phase offset) or have a different a middle position than the sieve jacket 8, whereby the peripheral segment 17 may also be moved at different points in time. The peripheral segments 17 may each be pivotably mounted about a pivot axis 18 assigned to each peripheral segment 17. With the implementation illustrated in FIGS. 2 and 3, the respective pivot axes 18 of all peripheral segments 17 and the rotational axis 6 all run in a common plane. Alternatively, the pivot axes 18 and the rotational axis 6 are in planes that are each orthogonal to each other, such as illustrated, for example, in FIG. 5.

The deflection device 27, schematically shown in FIG. 4 that causes the oscillating pivoting movement of the individual peripheral segments 17, may comprise a deflection drive 27a that oscillates independently of the rotary movement of the sieve device 7 about the rotational axis 6. One form of the deflection device 27 comprises an oscillating rotatable drive pulley, as well as a connecting means, such as connecting rods 27b that connect the deflection drive 27a to the peripheral segments 17. An oscillating rotary movement of the deflection drive 27a, portrayed in FIG. 4 as a curved double arrow 28, then causes the oscillating pivot movement of the peripheral segments 17 represented by the double arrow 9'. Specifically, one, some or all of the connecting rods 27b are connected to the oscillating rotary movement of the deflection drive 27a and follow the oscillating rotary movement, which is represented in FIG. 4 by a double arrow 29, in order to cause the oscillating pivot movement of the peripheral segments 17. For clarity, only one of the connecting rods 27b is portrayed in FIG. 4; however, a plurality of connecting rods 27b may be distributed (such as evenly distributed over the entire perimeter). For example, one connecting rod 27b may be positioned for each peripheral segment 17.

Figure 3:
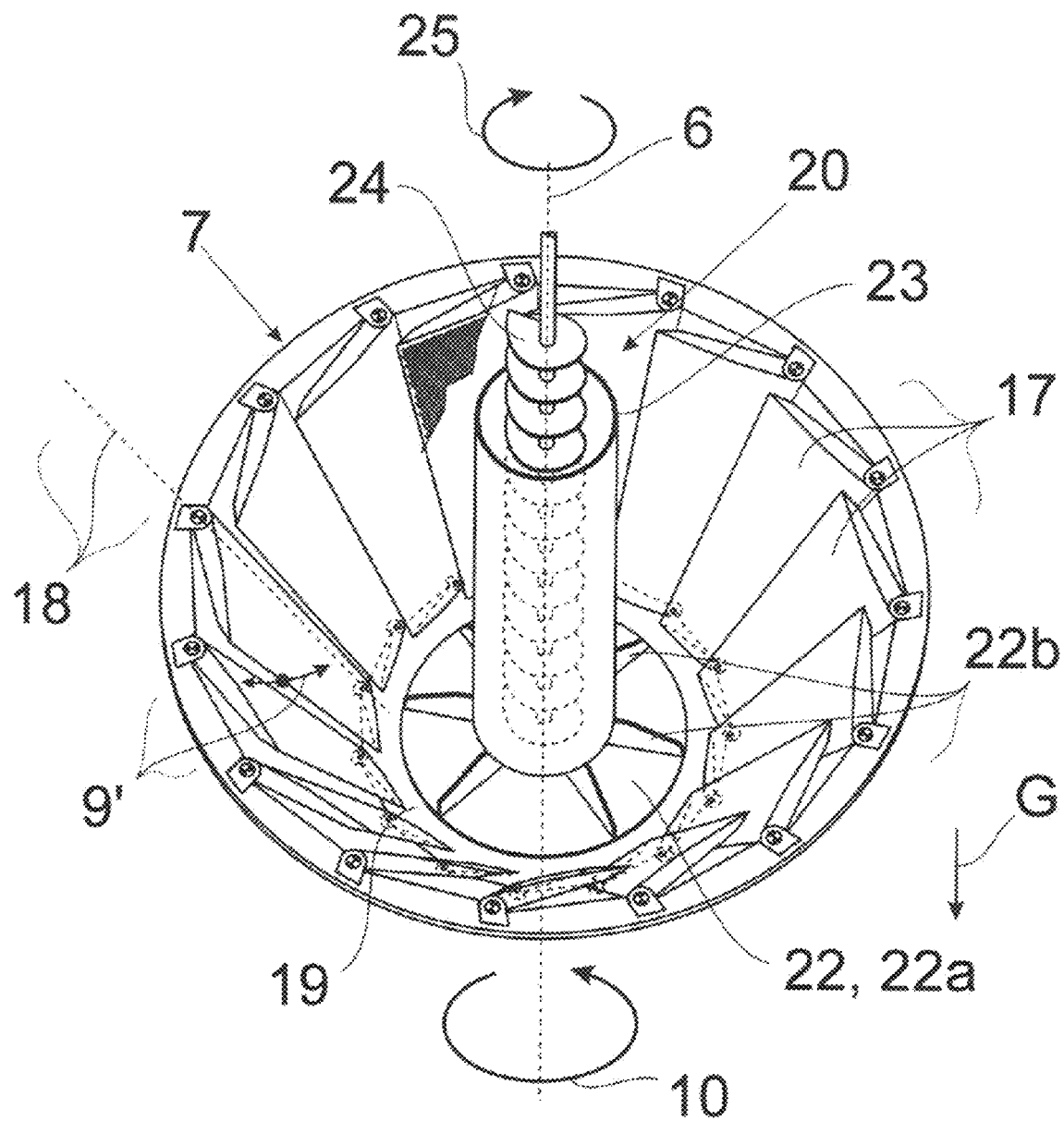
FIG. 3 shows a schematic perspective view of one implementation of a sieve device of the cleaning device from FIG. 2.
Figure 5:
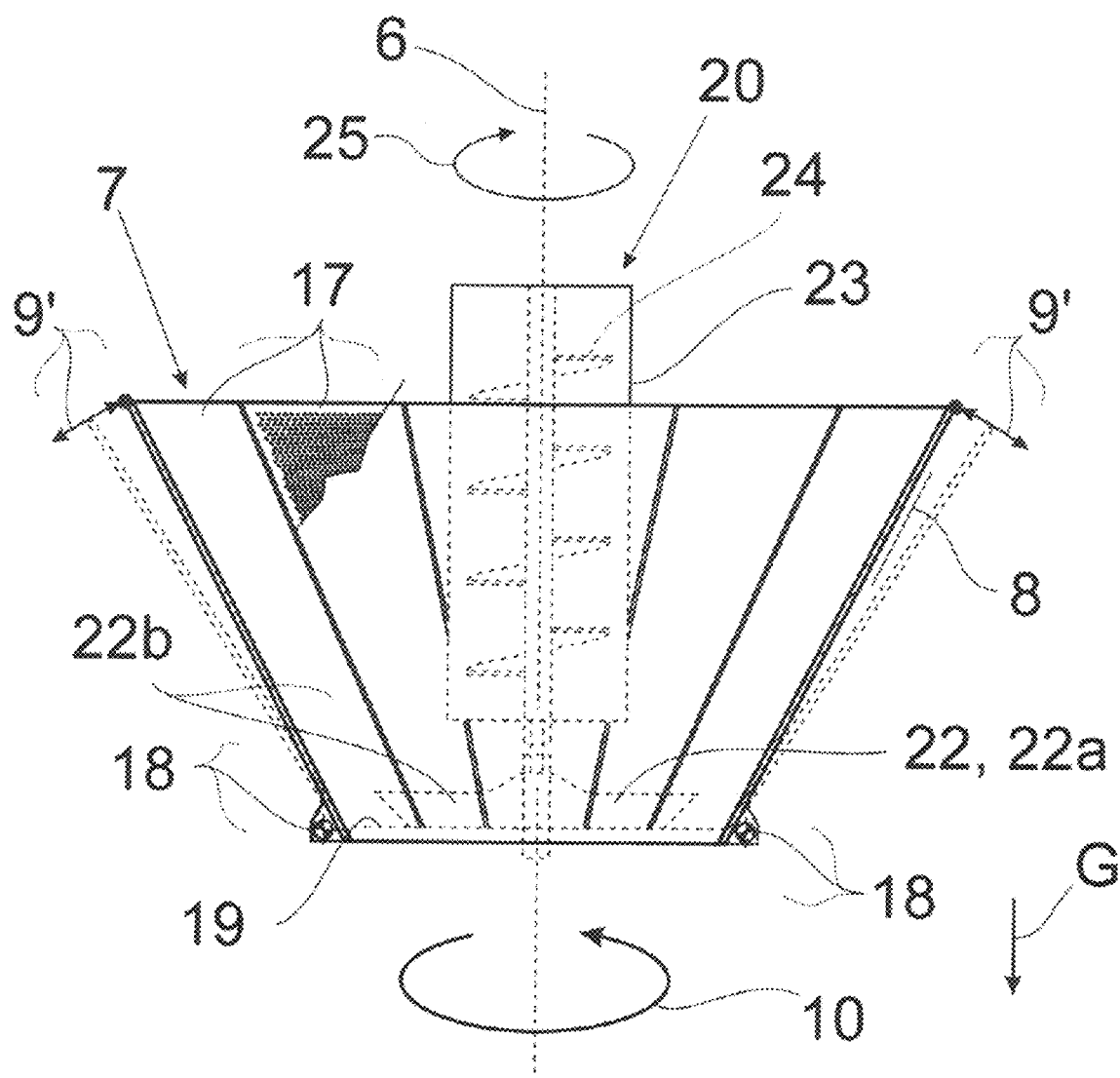
FIG. 5 shows a sectional view of an alternative implementation of a sieve device of the cleaning device from FIG. 2.

As illustrated in FIGS. 2, 3 and 5, the sieve jacket 8 may be formed sectionally or entirely substantially frustoconical. For example, it is contemplated that the sieve jacket is at least sectionally or entirely substantially cone-shaped (conical), pyramidal or frustopyramidal in shape. In these cases, the sieve jacket 8 may taper from its top end to its bottom end at which a floor 19 can be provided. Alternatively, the sieve jacket 8 may be designed sectionally or completely substantially cylindrical. In one implementation, "substantially" may mean that the radially outer and/or inner surface of the sieve jacket 8 may also have minor deviations from a purely substantially conical, frustoconical, pyramidal, or frustopyramidal surface contour which are caused in particular by overlaps of the peripheral segments 17 as FIG. 3 illustrates. Accordingly, in one implementation, the peripheral segments 17 may overlap each other in the peripheral direction at their radially outer position. On the one hand, an overlap has the advantage of reducing gap losses, e.g., the harvested material and in particular the non-grain components cannot readily escape from the sieve device 7 under centrifugal force through the arising gap between the adjacent peripheral segments 17. Moreover, an overlap ensures that no dead zones arise (only a rotational movement of the sieve jacket 8 without a movement component directed toward the rotational axis 6) that would prevent a breaking up of the mat of material at this location. Further, the slip between the harvested material and the sieve jacket 8 may not vary in such a dead zone, e.g., movement trajectories of the grains may be shorter along with the dwell time in the sieve device 7. In this regard, an overlap may improve the cleaning performance.

The sieve jacket 8 need not permanently have the described shape, such as a conical shape or cylindrical shape; instead, in one implementation, the sieve jacket 8 is the described shape at least in the state in which its peripheral segments 17 are in their radially outer position. In particular, the inner surface of the sieve jacket 8 and/or the inner surface of the peripheral segments 17 may run obliquely to or toward the rotational axis 6 in their radially outward position, in particular with a conical, frustoconical, pyramidal, or frustopyramidal shape, or parallel to the rotational axis 6, in particular with a cylindrical shape. The same also holds true for the respective pivot axes 18 of the peripheral segments 17 that may also run obliquely to the rotational axis 6, in particular with a conical, frustoconical, pyramidal, or frustopyramidal shape, or parallel to the rotational axis 6, in particular with a cylindrical shape.

The peripheral segments 17 may have a flat inner and/or outer surface or a curved inner and/or outer surface. In this case, the outer surface may have a curve such that the perimeter of the sieve jacket 8 is substantially uniformly round. Thus, depending on the shape of the sieve jacket 8, the peripheral segments may be substantially trapezoidal (see FIGS. 3 and 5) or substantially rectangular. In one implementation, the peripheral segments 17 may be evenly distributed over the perimeter and form in particular a rotationally symmetrical sieve jacket 8, such as a fifteen-sided rotationally symmetrical sieve jacket 8 according to FIG. 3.

FIG. 2 also portrays a supply device 20 configured to supply the harvested material into the interior of the sieve device 7, as well as a fan 21 (such as a suction fan), for generating an air stream 21a, which may blow through at least a part of the sieve device 7 (such as obliquely upward from below through the sieve device 7). Alternatively, or in addition, a rotating deflecting device 22 may be included to deflect and accelerate the harvested material in a radial direction that is introduced by means of the supply device 20 into the sieve device 7.

In one implementation, the supply device 20 has a delivery channel 23 which conveys material in an axial direction. In the interior of the delivery channel 23, a screw conveyor 24 (such as an auger) may be provided. The screw conveyor 24 is positioned to rotate in a predetermined direction, such as in a direction that is counter or opposite to the rotary movement of the sieve jacket 8 or the sieve device 7. Alternatively, the screw conveyor 24 may rotate in the same direction as the sieve jacket 8 or the sieve device 7. The rotary movement of the screw conveyor 24 is depicted in this case as curved arrow 25 running counterclockwise. The screw conveyor 24 conveys the harvested material to be segregated in an axial direction from the top end of the sieve device 7 in the direction of the bottom end of the sieve device 7.

At the bottom end of the delivery channel 23, the harvested material may then be discharged into the rotating sieve device 7, wherein the harvested material in this case first contacts the rotating deflecting device 22. As illustrated in FIGS. 2, 3 and 5, the deflecting device 22 may be a distribution plate 22a, which may have radially running bars 22b, along at least a section of a part of the deflection device, such as at least sectionally on the top or side. Alternatively, the deflection device may comprise an acceleration plate with edge-side bulges, protrusions or jutting portions, which may be combined with a scraper. In a first alternate implementation, the deflecting device 22 may comprise a flat baffle plate. In a second alternate implementation, the floor 19 of the sieve device 7 may comprise the deflecting device 22. The distribution plate 22a or the scraper may be arranged at an axial distance from the delivery channel 23, and, in this case, may rotate in the same direction as the sieve jacket 8 to prevent the harvested material from decelerating once it contacts the sieve jacket 8.

From the deflecting device 22, the harvested material may be pressed radially to the outside against the sieve jacket 8 under centrifugal force. In particular, the harvested material may be regularly thrown to the outside against the sieve jacket 8 in the direction of the rotational axis 6 by the oscillating movement, such as the peripheral segments 17. Due to this pulse-like movement of the harvested material by the sieve jacket 8 in the direction of the rotational axis 6, the grain may be separated from the non-grain components since the grains have a greater weight than the non-grain components. The air stream generated by the fan 21 may then impact the non-grain components, sending the non-grain components upward out of the sieve device 7, whereas the grains may again fall to the floor 19 in the direction of gravity G. From here, the grains may then flow under centrifugal force and freed of the non-grain components through the sieve holes in the sieve jacket 8 radially to the outside and, as described above, may be routed onward to the grain elevator 15.

Thus, the supply device 20, the fan 21 and deflecting device 22 may be positioned relative to the sieve device 7 such that the harvested material is first introduced axially in the direction of the bottom end or floor 19 of the sieve device 7, and is then deflected and accelerated radially to the outside in the region of the bottom end or floor 19. At least part of the harvested material may then be conveyed away axially and/or parallel to the inner surface of the sieve jacket 8 from the bottom end or the floor 19, for which a certain slip is provided between the inner surface of the sieve jacket 8 and the mat of material. In particular, this allows an "upward creep" of the mat of material on the inner surface of the sieve jacket 8, whereby the grains have different fall heights or fall levels when they are thrown or directed into the interior of the sieve device 7 by the oscillating movement. Finally, the grain passes through the sieve jacket 8 radially to the outside, and the non-grain components are removed at the top end facing away from the floor out of the sieve device 7, such as primarily in an axial direction, and may also to a lesser degree in a radial direction. To illustrate the material flows, the harvested material introduced into the sieve device 7 is designated EG in FIG. 2, the purified grain is designated K, and the separated non-grain components are designated NKB.

The sieve jacket 8 may, for example, have an axial extension which in this case defines the height as a first example within a range of 0.70 to 1.30 m, as a second example within a range of 0.80 to 1.20 m, or as a third example within a range of 0.90 to 1.10 m. The maximum inner diameter of the sieve jacket 8 at the bottom end of the sieve device 7 lies as a first example within a range of 0.50 to 1.10 m, as a second example within a range of 0.60 to 1.00 m, or as a third example within a range of 0.70 to 0.90 m. At the top end, the maximum inner diameter of the sieve jacket 8 can lie as a first example within a range of 1.40 to 2.00 m, as a second example within a range of 1.50 to 1.90 m, or as a third example within a range of 1.60 to 1.80 m. Given an angular or non-circular sieve jacket 8, the maximum inner diameter may mean the greatest extension orthogonal to the rotational axis 6 and running through the rotational axis 6.

In their oscillating movement, the pivoting angle of the peripheral segments 17 can lie as a first example within a range of 1 to 15°, as a second example within a range of 1 to 10°, or as a third example within a range of 3 to 6°. The pivot path of the end of the peripheral segment 17 distant from the pivot axis, e.g., the section of the peripheral segment 17 that traverses the greatest path in the oscillating movement, lies as a first example within a range of 10 to 200 mm, as a second example within a range of 30 to 150 mm, or as a third example within a range of 40 to 140 mm.

Various kinematic parameter ranges of the cleaning device and/or the sieve device are contemplated. The control device 26 of combine 1 may control and/or adjust the kinematic parameter ranges of the cleaning device 5 and/or sieve device 7. Specifically, control device 26 may include a microprocessor 30 and a storage medium 31. The microprocessor 30 may comprise a type of controller, such as processor, a microcontroller, an Application Specific Integrated Circuit (ASIC), Programmable Logic Device (PLD), or Field Programmable Gate Array (FPGA), or the like. Storage medium 31 may comprise one or more types of storage medium, such as volatile memory and/or non-volatile memory. Further, microprocessor 30 and storage medium 31 may be separate devices, communicating via an external bus. Alternatively, microprocessor 30 and storage medium 31 may be within the same device, communicating via an internal bus. Logic, such the functionality described here, may be implemented in software stored in storage medium 31 and/or stored within microprocessor 30. For example, the logic of control device in controlling the cleaning device may be implemented in software and may be configured to control one or more aspects of the cleaning device as described herein.

During a typical or normal operation of the cleaning device 5, the rotational speed of the sieve device 7 lies as a first example within a range of 50 to 250 RPM, as a second example within a range of 50 to 200 RPM, or as a third example within a range of 100 to 150 RPM. The frequency of the oscillating movement of the sieve jacket 8 or the peripheral segments 17 lies as a first example within a range of 1 to 30 Hz, as a second example within a range of 1 to 15 Hz, or as a third example within a range of 5 to 10 Hz. The rotational speed of the deflecting device 22 is may be adjusted as a first example to a value within a range of 100 to 300 RPM, as a second example to a value within a range of 100 to 250 RPM, or as a third example to a value within a range of 150 to 200 RPM. In one implementation, the rotational speed of the deflecting device 22 may be greater than the rotational speed of the sieve device 7 or the sieve jacket 8. The fan 21 may be adjusted so that the rotational speed of the impeller of the fan lies as a first example within a range of 150 to 350 RPM, as a second example within a range of 200 to 350 RPM, or as a third example within a range of 250 to 300 RPM. The flow speed of the fan may lie as a first example within a range of 0.5 to 2.5 m/s, as a second example within a range of 0.5 to 2.0 m/s, or as a third example within a range of 1.0 to 1.5 m/s.

REFERENCE NUMBER LIST

1 Combine
2 Crop
3 Infeed arrangement
4 Threshing device
5 Cleaning device
6 Rotational axis
7 Sieve device
8 Sieve jacket
9 Arrow for the oscillating movement of the sieve jacket
9' Arrow for the oscillating movement of the peripheral segments
10 Arrow for the rotating movement of the sieve jacket
11 Attachment arrangement
12 Cutting system
13 Inclined conveyor
14 Separating device
15 Grain elevator
16 Grain tank
17 Peripheral segments
18 Pivot axes
19 Floor
20 Supply device
21 Fan
21*a* Air stream
22 Deflecting device
22*a* Distribution plate
22*b* Bars
23 Delivery channel
24 Screw conveyor
25 Arrow of the rotational movement of the screw conveyor
26 Control device
27 Deflection device
27*a* Deflection drive
27*b* Connecting rods
28 Arrow for the oscillating movement of the deflection drive
29 Arrow for the oscillating movement of the connecting rod
30 Microprocessor
31 Storage medium
32 First edge section
33 Second edge section
34 Bottom section
G Direction of gravity
EG Harvested material to be segregated
K Portion of grain
NKB Portion of non-grain components Each of the items listed above may be associated with a single electronic device or may be combined within a single electronic device. Further, with regard to each separate electronic device, processing/memory functionality may be included.

The methods, devices, processing, circuitry, and logic described above may be implemented in many different ways and in many different combinations of hardware and software. As discussed above, a microprocessor 30 and a storage medium 31 may be used. The microprocessor 30 and a storage medium 31 are merely one example of a computational configuration. Other types of computational configurations are contemplated. For example, all or parts of the implementations may be circuitry that includes a type of controller, including as an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

What is claimed is:

1. A combine harvester comprising:
   an infeed arrangement configured to receive harvested material, the harvested material comprising crop;
   a threshing device configured to degrain the harvested material, wherein the threshing device is configured to generate a first portion of harvested material and a second portion of harvested material, the first portion of harvested material includes more grain than straw and the second portion of harvested material includes more straw than grain; and
   a cleaning device positioned downstream from the threshing device and configured to separate grain from non-grain components, the cleaning device comprising one or more components, a sieve device defining a rotational axis, and an at least sectionally sieve-shaped sieve jacket comprising a plurality of peripheral segments that extends in a peripheral direction around the rotational axis,
   wherein the one or more components of the cleaning device simultaneously move the sieve jacket in both a rotary movement and an oscillating movement,
   wherein the one or more components rotate the sieve device about the rotational axis, the rotational axis of the sieve device in a direction of gravity or oblique to the direction of gravity; and
   wherein the one or more components move the sieve jacket in the oscillating movement by moving the plurality of peripheral segments of the sieve jacket in a swinging movement about a pivot axis associated with the plurality of peripheral segments.

2. The combine harvester of claim 1, wherein each respective peripheral segment includes a first edge section and a second edge section, wherein the second edge section is opposite the first edge section;
   wherein the pivot axis associated with the respective peripheral segment goes through the first edge section of the respective peripheral segment; and
   wherein the swinging movement is greater on the second edge section than on the first edge section of the respective peripheral segment.

3. The combine harvester of claim 2, wherein each respective peripheral segment is attached to at least two adjacent peripheral segments at the first edge section.

4. The combine harvester of claim 1, wherein the rotational axis and the pivot axis are oblique to one another; and
   wherein the rotational axis and the pivot axis intersect below a floor of the cleaning device, the floor orthogonal to a direction of rotation; and
   wherein the swinging movement for the at least one of the peripheral segments swings the at least one of the peripheral segments toward the rotational axis and away from the rotational axis in a back-and-forth movement.

5. The combine harvester of claim 1, wherein the pivot axis and the rotational axis lie in a common plane.

6. The combine harvester of claim 1, wherein the pivot axis is parallel to the rotational axis of the sieve device.

7. The combine harvester of claim 1, wherein the cleaning device is configured to subject each of the peripheral segments of the sieve jacket to the swinging movement about the pivot axis associated with a respective peripheral segment;
   wherein each of the peripheral segments of the sieve jacket are subject, at least partly simultaneously, to the swinging movement and the rotary movement; and
   wherein the swinging movement of the peripheral segments are executed in sync.

8. The combine harvester of claim 7, wherein the cleaning device further comprises a deflection device configured to generate an oscillating pivoting movement of each of the peripheral segments.

9. The combine harvester of claim 8, wherein the deflection device comprises an oscillating rotatable drive pulley and connecting rods, with a respective connecting rod connected to a section of a respective peripheral segment, the section proximate to a floor of the cleaning device.

10. The combine harvester of claim 1, wherein the cleaning device comprises a supply device configured to supply the harvested material into an interior of the sieve device; and
    wherein the supply device includes an axial delivery channel and a rotating, axially running screw conveyor, the axial delivery channel for supplying the harvested material into the interior of the sieve device.

11. The combine harvester of claim 1, wherein the cleaning device comprises at least one of a supply device, a fan or a diverting device; and
    wherein the at least one of the supply device, the fan or the diverting device is oriented relative to the sieve device such that the harvested material is first introduced axially in a direction of a bottom end of the sieve device, and thereafter diverted radially to an outside in a region of the bottom end of the sieve device, and thereafter at least a part of the harvested material is conveyed away axially or parallel to an inner surface of the sieve jacket from the bottom end of the sieve device, and thereafter the grain passes through the sieve jacket radially to the outside and, at a top end of the sieve device, the non-grain components are removed therefrom.

12. The combine harvester of claim 1, wherein the rotational axis of the sieve device runs in a direction of gravity or is oblique to the direction of gravity.

13. The combine harvester of claim 1, wherein a radial position of the rotational axis of the sieve device is stationary relative to the threshing device during the swinging movement of the sieve jacket.

14. The combine harvester of claim 1, wherein the one or more components comprise a deflection drive.

15. The combine harvester of claim 14, wherein the deflection drive include rods connected to the plurality of peripheral segments.

16. The combine harvester of claim 1, wherein the one or more components comprise a rotatable drive pulley.

17. The combine harvester of claim 1, wherein the one or more components comprise an oscillating device and connecting means for connecting the oscillating device to the plurality of peripheral segments.

18. The combine harvester of claim 1, wherein the one or more components comprise an oscillating rotatable drive device and connecting means for connecting the oscillating rotatable drive device to the plurality of peripheral segments.

19. A combine harvester comprising:
an infeed arrangement configured to receive harvested material, the harvested material comprising crop;
a threshing device configured to degrain the harvested material, wherein the threshing device is configured to generate a first portion of harvested material and a second portion of harvested material, the first portion of harvested material includes more grain than straw and the second portion of harvested material includes more straw than grain; and
a cleaning device positioned downstream from the threshing device and configured to separate grain from non-grain components, the cleaning device comprising a sieve device configured to rotate about a rotational axis and an at least sectionally sieve-shaped sieve jacket comprising a plurality of peripheral segments that extends in a peripheral direction around the rotational axis,
wherein the cleaning device is configured to subject the sieve jacket to a rotary movement,
wherein the cleaning device is configured to subject at least one of the peripheral segments of the sieve jacket to a swinging movement about a pivot axis associated with the at least one of the peripheral segments, and
wherein the at least one of the peripheral segments of the sieve jacket is subject, at least partly simultaneously, to the rotary movement and the swinging movement,
wherein the cleaning device further includes a deflecting device in an interior of the sieve device, the deflective device configured to deflect and accelerate in a radial direction the harvested material introduced into the sieve device; and
wherein the deflective device comprises a rotating delivery plate which has radially running bars, at least sectionally, on at least one side, or a rotating scraper and an associated acceleration plate.

20. The combine harvester of claim 19, wherein the cleaning device comprises a supply device configured to supply the harvested material into an interior of the sieve device, the supply device includes an axial delivery channel and a rotating, axially running screw conveyor, the axial delivery channel for supplying the harvested material into the interior of the sieve device; and
wherein the delivery plate or the scraper is arranged at an axial distance from the axial delivery channel and is connected to rotate conjointly with the screw conveyor.

21. A combine harvester comprising:
means for receiving harvested material, the harvested material comprising crop;
means for degraining the harvested material by generating a first portion of harvested material and a second portion of harvested material, the first portion of harvested material includes more grain than straw and the second portion of harvested material includes more straw than grain; and
means for separating grain from non-grain components, the means for separating grain from non-grain components positioned downstream from the means for degraining the harvested material, the means for separating grain from non-grain components comprising a sieve device defining a rotational axis and an at least sectionally sieve-shaped sieve jacket comprising a plurality of peripheral segments that extends in a peripheral direction around the rotational axis,
wherein the means for separating grain from non-grain components subjects the sieve jacket to a rotary movement,
wherein the means for separating grain from non-grain components subjects at least one of the peripheral segments of the sieve jacket to a swinging movement about a pivot axis associated with the at least one of the peripheral segments such that the at least one of the peripheral segments of the sieve jacket is subjected, at least partly simultaneously, to the rotary movement and the swinging movement.

* * * * *